United States Patent [19]

Clarke

[11] 4,092,104
[45] May 30, 1978

[54] PROCESS FOR MAKING YELLOW, BASIC AZOMETHINE DYES

[75] Inventor: Ray Allen Clarke, Pitman, N.J.

[73] Assignee: E. I. Du Pont de Nemours and Company, Wilmington, Del.

[21] Appl. No.: 668,913

[22] Filed: Mar. 22, 1976

Related U.S. Application Data

[62] Division of Ser. No. 448,363, Mar. 5, 1974, Pat. No. 3,973,903.

[51] Int. Cl.² .................. C09B 27/00; C08J 3/20
[52] U.S. Cl. .................. 8/41 R; 8/76; 8/79; 260/164; 8/92; 8/93
[58] Field of Search .................. 8/41 R, 79, 92, 93

[56] References Cited

U.S. PATENT DOCUMENTS

| 3,345,355 | 10/1967 | Raue ................................ 260/165 |
| 3,346,322 | 10/1967 | Finkenauer et al. ................ 8/79 |
| 3,718,642 | 2/1973 | Lehment et al. ................... 260/165 |
| 3,741,982 | 6/1973 | Fujimo .............................. 260/326.15 |
| 3,973,903 | 8/1976 | Clarke .............................. 8/92 |

FOREIGN PATENT DOCUMENTS

| 1,205,638 | 1/1965 | Germany. |
| 2,104,624 | 11/1973 | Germany. |
| 1,795,100 | 10/1972 | Germany. |

*Primary Examiner*—A. Lionel Clingman

[57] ABSTRACT

A process for making yellow, basic azomethine dyes for paper, leather and textiles; the process being an improvement in the process of reacting an azo dye base precursor of the formula

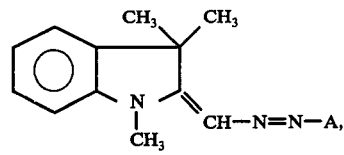

wherein A is phenyl or substituted phenyl, with dimethyl sulfate in solution, and in the presence of an acid-binding agent, the improvement comprising reacting dimethyl sulfate in a molar excess of from 100% to 300% per mole of precursor, in an aqueous solution having at least 30 weight percent water and from 2.0 to 3.5 moles of magnesium oxide (as the acid-binding agent) per mole of precursor.

1 Claim, No Drawings

PROCESS FOR MAKING YELLOW, BASIC AZOMETHINE DYES

CROSS-REFERENCE TO RELATED APPLICATION

This is a divisional application of copending patent application bearing U.S. Ser. No. 448,363, filed on Mar. 5, 1974, now U.S. Pat. No. 3,973,903.

BACKGROUND OF THE INVENTION

Basic azomethine dyes are used extensively in the form of relatively dilute aqueous solutions in the paper, textile and leather industries. Heretofore, dyeing solutions have been prepared by the dyer from finely ground dyes. The finely ground dyes have the disadvantage of caking through the action of moisture or heat, with subsequent difficulty in dissolving the dyes. Moreover, weighing or transferring the powdered dyes is attended by unpleasant dust formation. In addition, during dissolution of the dyes and subsequent stirring, frothing often takes place leading to consequent contamination and loss.

The process of this invention has several advantages over prior art processes. The novel process leads to pure dyes that are substantially free of unreacted azo dye base and/or protonated dye salt contamination caused, inter alia, by not using acid-binding agents or by not using them in sufficient amount. Because of this freedom from azo dye base and protonated dye salt contamination, the dyes produce brighter dyeings having very good light fastness and sublimation fastness compared to dyeings made with contaminated dyes.

Further, the novel process leads to dyes substantially free of the water-insoluble carbinol form of the dye which requires an additional acid neutralization step to be converted to the desired quaternized form. The carbinol form sometimes results from alkaline neutralization of the quaternized dye salt during quaternization when an alkaline acid-binding agent is employed. Detectable amounts of the carbinol form in the final dye will of course, cut down correspondingly on dye strength and adversely affect the shade. A lowering of yield will also occur.

The novel process of this invention for making dyes of the formula

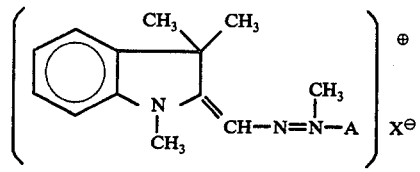

is an improvement in the process of reacting an azo dye base (precursor) of the formula

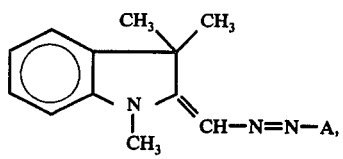

wherein A is phenyl or phenyl substituted by 1 to 3 groups selected from $C_{1-4}$ alkyl and $C_{1-4}$ alkoxy, and $X^{\ominus}$ is an anion, with dimethyl sulfate in solution, and in the presence of an acid-binding agent, the improvement comprising (i) reacting dimethyl sulfate in a molar excess of from 100% to 300% per mole of precursor, in an aqueous solution having at least 30 weight percent water and from 2.0 to 3.5 moles of magnesium oxide per mole of precursor.

The azo reactant is referred to as the "azo dye base" for convenience and simplicity. It should be understood, however, that the corresponding acid salts are also operable as reactants (precursors) and are therefore included within the scope of the invention without being referred to repeatedly.

Reaction temperatures are generally maintained at between about 60° C to 120° C. Following the reaction of step (i) to produce the dye solution, the dye can be isolated in dry form. Isolation of the dry dyestuff can be conducted readily at a pH below about 2.5.

An alternative to the isolation of the dry dye is to adjust the constituency of the dye solution that is prepared by the novel process outlined above, to produce preferred dye solutions. That is, to produce preferred dye solutions an additional step is needed of adjusting the constituency of the intermediate dye solutions. The preferred azomethine dye solutions made according to the process of this invention comprise:

5% to 50% by weight of dye,
10% to 95% by weight of solvent, and
0 to 40% by weight of water.

The additional process step concerns adjusting the intermediate dye solution constituency to remove organic reaction solvent and/or water, and to add the other necessary ingredients in the requisite amounts. For the sake of simplicity the term "adjusting constituency" encompasses the process step, step (ii), of adding and/or removing ingredients. It should be understood that such "adjusting" is conducted at a pH below about 2.5 and the term includes acidification to achieve such pH.

The anion $X^{\ominus}$ can be derived from an inorganic or organic acid, e.g. from hydrohalic acids ($Cl^{\ominus}$, $Br^{\ominus}$, $I^{\ominus}$), sulfuric acid ($SO_4^{\ominus}$) methylsulfuric acid ($CH_3SO_4^{\ominus}$); from alkyl or aryl sulfonic acids (alkyl or aryl $SO_3^{\ominus}$); or from $C_{1-4}$ aliphatic carboxylic acids such as formic acid, acetic acid or propionic acid ($C_{1-3}$ alkyl $CO_2^{\ominus}$). Double salts of the dye salts obtained according to the invention can often be advantageously produced, especially the zinc chloride double salts. In this case, $X^{\ominus}$ represents such complex anions as the trichlorozincate ion ($ZnCl_3^{\ominus}$).

DETAILS OF THE INVENTION

The novel process is typically carried out by heating the reaction medium comprising the azo dye base precursor to 60° to 120° C., preferably 70° to 100° C., with 2.0 to 3.5 moles, preferably 2.5 to 3 moles of magnesium oxide per mole of azo dye base precursor in 1.5 to 5, preferably 1.5 to 2.5 parts by weight (per part by weight of azo dye base precursor) of aqueous or aqueousorganic solvent.

Then, while maintaining the reaction temperature at 70° to 100° C., an addition is made dropwise, in the course of 0.5 to 2 hours, of 100% to 300%, preferably 140% to 200%, of the theoretically required amount of dimethyl sulfate. Heating is continued for an additional 0.5 to 2 hours. To the reaction mixture are then added 10% to 100%, by weight of the reaction mixture, of water and sufficient acid which can be a hydrohalic acid or sulfuric acid, to bring the pH of the reaction below 2.5. Preferably, sulfuric acid is used and a pH of 1.5 to 2.0 is obtained.

The reaction medium can consist wholly of water but can also be a heterogeneous mixture of water and an aromatic, optionally halogenated, hydrocarbon solvent. Water can be used as the sole reaction medium when the starting azo dye base has a melting point of about 100° C. or less. Azo dye bases having melting points substantially higher than 100° C. require the addition of the aromatic cosolvents. It should be appreciated that such aromatic cosolvents are removed whether by isolation of the dry dye therefrom, or, by separation from the reaction medium in the "adjusting" process step to achieve the novel dye solutions. Such aromatic (reaction) cosolvents are not the cosolvents employed in the novel dye solutions.

Useful aromatic solvents include benzene, toluene, xylene, o-dichlorobenzene, monochlorobenzene and the like. Monochlorobenzene is particularly preferred. Aqueous-organic solvent mixtures containing from 30% to 100% water and up to 70% aromatic solvent by weight are operable in the process. Incomplete solution of the starting azo dye base in the aqueous organic reaction medium generally reduces the rate of quaternization and is to be avoided. A reaction medium consisting of 90% water and 10% monochlorobenzene by weight has provided especially satisfactory results when employed in the process.

After acidification of the reaction medium to a pH below 2.5, any organic solvent present can be removed by steam distillation. Thereupon, the quaternized basic dye separates as a concentrated oily layer which can be removed readily from the aqueous reaction mixture. The dye concentrate can then be diluted to a standard strength with suitable solvents such as water-soluble carboxylic acids and/or other hydroxyl-containing cosolvents and packaged in suitable containers for shipping.

An acid-binding agent must be present to obtain optimum conversion of the azo dye base to the quaternized dye. A comparison of such agents, e.g. sodium hydroxide, lithium hydroxide, sodium borate and the like, showed them to give 10 to 20 percent unreacted azo dye base at the end of the quaternization cycle. With magnesium oxide as the acid-binding agent, the amount of unreacted azo dye base was reduced to a level of one percent or less.

Using the process of this invention, it is possible to perform quaternization in a more complete manner than previously and at considerably less expense than realized when operating in the hitherto usual organic reaction media.

Examples of carboxylic acids useful as solvents in the concentrated dye solutions of the invention are monocarboxylic acids, particularly aliphatic monocarboxylic acids. It is required to use low molecular weight liquid carboxylic acids having six carbon atoms or less. Water-soluble hydroxycarboxylic acids are also suitable. Examples of suitable acids are formic acid, acetic acid, propionic acid and especially glycolic acid.

The carboxylic acid solvents can be used either by themselves or in admixture with one or more hydroxylic (hydroxyl-containing) solvents, for example, alcohols, glycols and glycol ethers. Suitable alcohols, glycols and glycol ethers are benzyl alcohol, diacetone alcohol, ethylene glycol, diethylene glycol, propylene glycol and ethylene glycol monomethyl or monoethyl ether. Such hydroxylic solvents are sometimes employed in the absence of carboxylic acid cosolvents.

A basic dye solution of the present invention can also be prepared by mixing the solid form of the isolated basic azomethine dyes with the disclosed solution components in any order and stirring the mixture with heating if necessary. The resulting solution can be filtered to remove insoluble residue and the concentration of the solution is adjusted by adding basic dye, water, or organic solvent as desired.

The dye solutions made by the process of this invention are highly concentrated. They remain liquid at temperatures below the freezing point (e.g. −10° C.) and the dissolved dye does not crystallize out. There is, furthermore, no falling off of the concentration upon prolonged storage of the solution. The subject process provides a simple method of obtaining highly concentrated solutions of basic azomethine dyes which can be used directly as stable liquid commercial preparations of the respective dyestuffs.

The basic dye solutions prepared by the process of this invention can be used for the dyeing by conventional procedures. Dyeing can also be effected by absorption of entrained dye solution during the actual spinning and drawing operations pursuant to fiber manufacture.

By proper selection of the anion in the subject quaternization process, the dye solutions can be prepared as chloride-free products in order to avoid corrosion of stainless steel equipment used in the trade for the manufacture and dyeing of textile fibers. The sulfate salts of the dyes are particularly useful in this regard.

The following Examples serve to illustrate the invention. All parts are given by weight.

EXAMPLE 1

A mixture of 175 parts of water, 33 parts of monochlorobenzene, 84.8 parts (0.29 mole) of an azo dye base having the formula

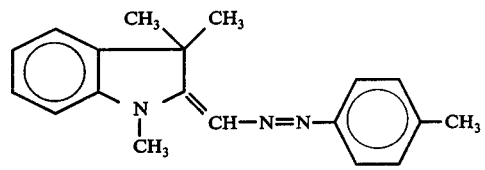

and 40 parts (1 mole, 3.4 moles per mole of azo dye base) of magnesium oxide was heated to 90° to 95° C. Dimethyl sulfate (88.2 parts, 0.70 mole, 140% molar excess) was then added over 30 to 40 minutes, while maintaining the temperature at 90° to 95° C. The reaction mixture was then maintained at 90° to 95° C. for an additional 30 minutes. Thin layer chromatography on Silica Gel G plates using methyl ethyl ketone/water (10/1) as eluent indicated that over 99% of the azo dye base had been quaternized. Water (47 parts) and 142 parts of concentrated (37%) hydrochloric acid were then added while maintaining the temperature at 90° to 95° C. The pH dropped to 1.5 to 2.0 during the acid addition. The heterogeneous monochlorobenzene-water mixture was then cooled with stirring over a 4-hour period to 5° to 10° C. The product, an azomethine dye having the formula

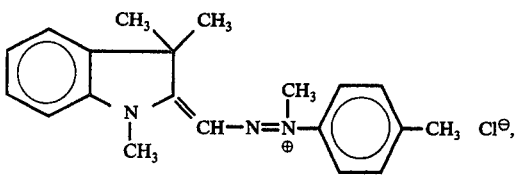

crystallized out as fine yellow crystals and was subsequently isolated by filtration, washed with 300 parts of 10% sodium chloride solution and dried at 85° to 90° C. under vacuum. The dye was chromatographically pure. Yield: 134 parts (98%), calculated from the weight of product and its tinctorial strength as compared with a purified standard.

EXAMPLE 2

A mixture of 80 parts of water, 20 parts (0.50 mole, 2.8 moles per mole of azo dye base) of magnesium oxide and 50 parts (0.18 mole) of an azo dye base of the formula

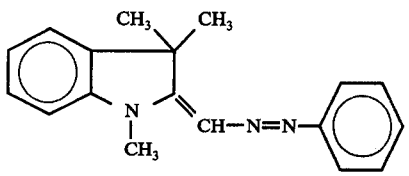

was heated to 95° to 100° C. Dimethyl sulfate (54 parts, 0.43 mole, 140% molar excess) was gradually added at such a rate so as to maintain the temperature in the range of 95° to 100° C. The pH of the mixture was initially 9 but dropped to 6.5 upon completion of the dimethyl sulfate addition. The reaction mixture was heated an additional 30 minutes at 95° to 100° C. Thin layer chromatography indicated that over 99% of the azo dye base had been quaternized. The reaction mixture was then cooled to 50° to 60° C. and a solution of 41 parts of concentrated sulfuric acid in 140 parts of water was added. After the acid addition was complete, the pH was 1.5-2.0. The reaction mixture was allowed to stand while the temperature was maintained at 50° to 60° C. The lower aqueous layer was removed and discarded. The concentrated upper layer containing product of the formula

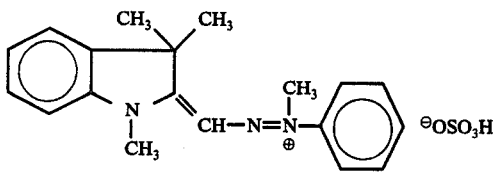

was diluted with 200 parts of 70% aqueous glycolic acid to give a final dye solution containing 22% by weight of basic dye as the acid-sulfate salt, 47% by weight of glycolic acid (100%) and 31% by weight of water.

EXAMPLE 3

The procedure of Example 2 was repeated except that the 200 parts of 70% aqueous glycolic acid were replaced by a mixture of 80 parts of ethylene glycol, 80 parts of diacetone alcohol and 40 parts of water to give a final dye solution containing 22% by weight of basic dye as the acid-sulfate salt, 27% by weight of ethylene glycol, 27% by weight of diacetone alcohol and 24% by weight of water.

EXAMPLE 4

The procedure of Example 2 was repeated except that the 200 parts of 70% aqueous glycolic acid were replaced by a mixture of 36 parts of glacial acetic acid and 36 parts of 70% aqueous glycolic acid to give a final dye solution containing 41% by weight of basic dye as the acid-sulfate salt, 21% by weight of acetic acid, 14% by weight of glycolic acid (100%) and 24% by weight of water.

EXAMPLE 5

A mixture of 180 parts of water, 75 parts of monochlorobenzene, 24 parts (0.63 mole, 2.5 moles per mole of azo dye base) of magnesium oxide and 77 parts (0.25 mole) of an azo dye base of the formula

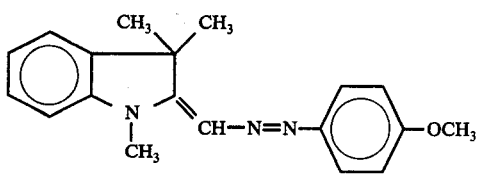

was heated to 90° to 95° C. Dimethyl sulfate (94.5 parts, 0.75 mole, 200% molar excess) was added gradually over about a 30 minute period. The reaction mixture was then heated for 30 minutes at 90° to 95° C. Based on thin layer chromatography, the quaternization was greater than 99% complete. Water (400 parts) was added and the excess magnesium oxide was neutralized by the gradual addition of 61 parts of concentrated sulfuric acid. The pH of the final mixture was 1.5-2.0. The monochlorobenzene was then removed by steam distillation. The reaction mixture was then allowed to stand while maintaining the temperature at 65° to 75° C. The dye layer separated an an oil phase which was separated from the aqueous phase. The resultant hot (65° to 75° C.), concentrated oil phase, consisting of about 80% pure dye was diluted with 200 parts of 70% aqueous glycolic acid solution and 75 parts of glacial acetic acid to give a final dye solution containing approximately 24% by weight of dye as the acid sulfate salt, 35% by weight of glycolic acid (100%), 19% by weight of acetic acid and 21% by weight of water.

Instead of a solution product, the dye can be readily obtained as a crystalline solid by omitting the aforementioned dye-oil separation step and merely cooling to 5° to 10° C. The dye readily crystallizes and can then be isolated by filtration and dried.

Alternately, the removal of monochlorobenzene by steam distillation may be omitted and the heterogeneous reaction mixture cooled to 5° to 10° C. to obtain the dye as the crystalline sulfate salt. Under these conditions, the filter cake is washed with a 10% solution of aqueous sodium sulfate to aid in the removal of some of the monochlorobenzene from the filter cake before drying.

A solution product of the dye may also be obtained by using the isolated dye sulfate salt and 70% glycolic acid alone or a mixture of glycolic acid and acetic acid as the solvent to provide dye solutions containing from 20% to 30% dye by weight.

If the presence of chloride ions is not objectionable, the dye can also be isolated as the chloride salt by neutralizing the reaction mass with 106 parts of 37% aqueous hydrochloric acid instead of with sulfuric acid. Again by cooling to 5° to 10° C., with or without steam distillation of monochlorobenzene, the dye crystallizes mainly as the chloride salt and can be isolated by filtration and dried.

EXAMPLE 6

The procedure of Example 5 was repeated except that the 200 parts of 70% aqueous glycolic acid and 75 parts of glacial acetic acid was replaced by 275 parts of 70% aqueous glycolic acid to give a final dye solution containing 24% by weight of basic dye as the acid-sulfate salt, 49% by weight of glycolic acid (100%) and 27% by weight of water.

EXAMPLE 7

A mixture of 200 parts of water, 75 parts of monochlorobenzene, 24 parts (0.63 mole, 2.5 moles per mole of azo dye base) of magnesium oxide and 80 parts (0.25 mole) of an azo dye base of the formula

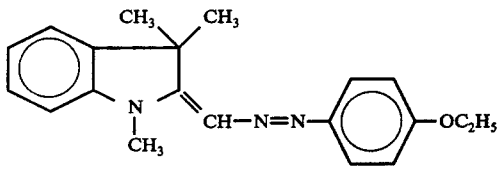

was heated to 90° to 95° C. Dimethyl sulfate (94.5 parts, 0.75 mole, 200% molar excess) was added gradually over a 30 minute period. The reaction mixture was heated an additional 15 minutes at 90° to 95° C. Based on thin layer chromatography, the quaternization appeared to be essentially complete. Water (400 parts) was added and the excess magnesium oxide was neutralized by the addition of 61 parts of concentrated sulfuric acid. The pH of the mixture was 2.0. The reaction mixture was cooled to 10° to 15° C. in order to precipitate the dye, which was subsequently isolated by filtration, washed with 10% aqueous sodium sulfate solution to remove some of the monochlorobenzene and finally dried to give 110 parts of pure basic dye as the acid-sulfate salt.

A concentrated solution product of the dye was obtained by dissolving the isolated dye salt (26 parts) in 30 parts of glacial acetic acid and 44 parts of 70% aqueous glycolic acid to give a final dye solution containing 26% by weight of basic dye as the acid-sulfate salt, 30% by weight of acetic acid, 31% by weight of glycolic acid (100%) and 13% by weight of water.

The embodiments of the invention in which an exclusive property or privilege is claimed are defined as follows:

1. In a process for making solutions of dyes of the formula

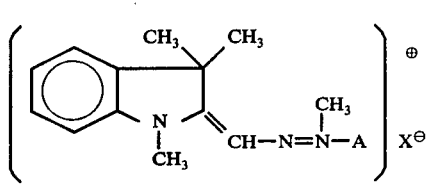

comprising reacting a precursor of the formula

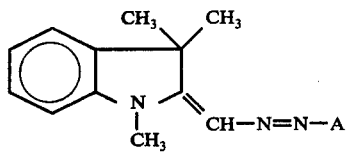

wherein A is phenyl or phenyl substituted by 1 to 3 groups selected from $C_{1-4}$ alkyl and $C_{1-4}$ alkoxy, and X is an anion, with dimethyl sulfate in solution and in the presence of an acid-binding agent, the improvement comprising
  (i) reacting dimethyl sulfate in a molar excess of from 100% to 300% per mole of precursor, in an aqueous solution having at least 30 weight percent water and from 2.0 to 3.5 moles of magnesium oxide per mole of precursor, and
  (ii) adjusting the constituency of the solution made in step (i) to produce a dye solution comprising 5% to 50% by weight of dye, 10% to 95% by weight of at least one solvent selected from the group consisting of acetic acid, formic acid, propionic acid, glycolic acid, benzyl alcohol, diacetone alcohol, ethylene glycol, diethylene glycol, propylene glycol, ethylene glycol monomethyl ether, and ethylene glycol monoethyl ether, and 0 to 40% by weight of water.

* * * * *

UNITED STATES PATENT OFFICE
CERTIFICATE OF CORRECTION

PATENT NO. : 4,092,104
DATED : May 30, 1978
INVENTOR(S) : Ray Allen Clarke

It is certified that error appears in the above-identified patent and that said Letters Patent are hereby corrected as shown below:

Column 8, line 29, "X" should be -- $X^{\ominus}$ --.

Signed and Sealed this

Seventh Day of November 1978

[SEAL]

Attest:

RUTH C. MASON
Attesting Officer

DONALD W. BANNER
Commissioner of Patents and Trademarks